US008357439B2

(12) United States Patent
Wehrmann

(10) Patent No.: US 8,357,439 B2
(45) **Date of Patent: *Jan. 22, 2013**

(54) WEB AND METHOD FOR MAKING FLUID FILLED UNITS

(75) Inventor: Rick Steven Wehrmann, Hudson, OH (US)

(73) Assignee: Automated Packaging Systems, Inc., Streetsboro, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/036,172

(22) Filed: Feb. 28, 2011

(65) Prior Publication Data

US 2011/0165352 A1 Jul. 7, 2011

Related U.S. Application Data

(62) Division of application No. 11/594,539, filed on Nov. 8, 2006, now Pat. No. 7,897,220, which is a division of application No. 11/141,304, filed on May 31, 2005, now Pat. No. 7,757,459.

(60) Provisional application No. 60/576,004, filed on Jun. 1, 2004, provisional application No. 60/592,812, filed on Jul. 30, 2004.

(51) Int. Cl.
*B32B 1/02* (2006.01)
*B32B 1/08* (2006.01)

(52) U.S. Cl. ..................... 428/35.2; 428/34.1; 428/34.2; 428/35.7; 428/35.9; 428/36.9

(58) Field of Classification Search ................. 428/34.1, 428/34.2, 35.7, 35.9, 36.9, 35.2
See application file for complete search history.

(56) References Cited

U.S. PATENT DOCUMENTS

| | | | |
|---|---|---|---|
| 2,153,214 | A | 4/1939 | Tondrean |
| 3,033,257 | A | 5/1962 | Weber |
| 3,254,820 | A | 6/1966 | Lerner |
| 3,254,828 | A | 6/1966 | Lerner |
| 3,298,156 | A | 1/1967 | Lerner |
| 3,358,823 | A | 12/1967 | Paxton |
| 3,359,703 | A | 12/1967 | Quaadgras |
| 3,389,534 | A | 6/1968 | Pendleton |
| 3,414,140 | A | 12/1968 | Feldkamp |
| 3,462,027 | A | 8/1969 | Puckhaber |
| 3,477,196 | A | 11/1969 | Lerner |
| 3,523,055 | A | 8/1970 | Lemelson |
| 3,575,757 | A | 4/1971 | Smith |
| 3,575,781 | A | 4/1971 | Pezely |
| 3,577,305 | A | 5/1971 | Hines et al. |

(Continued)

FOREIGN PATENT DOCUMENTS

| | | |
|---|---|---|
| CA | 2428246 | 9/2002 |
| EP | 1466720 | 10/2004 |

(Continued)

OTHER PUBLICATIONS

Office action from U.S. Appl. No. 11/299,933 dated Jun. 14, 2010.

(Continued)

*Primary Examiner* — Marc Patterson
(74) *Attorney, Agent, or Firm* — Calfee, Halter & Griswold, LLP

(57) ABSTRACT

A preformed web and a method of producing dunnage units from the preformed web. The web is an elongate flattened thermoplastic tube having an inflation edge and an opposite edge. The tube includes spaced transverse seals that define sides of pouches. In one embodiment, the web is configured such that a gap forms between each pair of adjacent pouches when the pouches are inflated. In one embodiment, an inflation edge of the web comprises a frangible connection that allows the inflation edge to be broken by an unsharpened object.

20 Claims, 7 Drawing Sheets

U.S. PATENT DOCUMENTS 3,616,155 A 10/1971 Chavannes
3,618,286 A 11/1971 Membrino
3,650,877 A 3/1972 Johnson
3,660,189 A 5/1972 Troy
3,667,593 A 6/1972 Pendleton
3,730,240 A 5/1973 Presnick
3,744,211 A 7/1973 Titchenal et al.
3,791,573 A 2/1974 Titchenal et al.
3,795,163 A 3/1974 Armstrong et al.
3,802,974 A 4/1974 Emmel
3,808,981 A 5/1974 Shaw
3,813,845 A 6/1974 Weikert
3,817,803 A 6/1974 Horsley
3,837,990 A 9/1974 McConnell et al.
3,837,991 A 9/1974 Evans et al.
3,855,037 A 12/1974 Imhagen et al.
3,938,298 A 2/1976 Luhman et al.
3,939,991 A 2/1976 Evans
3,939,995 A 2/1976 Baxter
3,941,306 A 3/1976 Weikert
4,014,154 A 3/1977 Lerner
4,017,351 A 4/1977 Larson
4,021,283 A 5/1977 Weikert
4,040,526 A 8/1977 Baxter et al.
4,044,693 A 8/1977 Ramsey, Jr.
4,076,872 A 2/1978 Lewicki et al.
4,096,306 A 6/1978 Larson
4,102,364 A 7/1978 Lowdermilk
4,103,471 A 8/1978 Lowdermilk
4,146,069 A 3/1979 Angarola et al.
4,169,002 A 9/1979 Larson
4,201,029 A 5/1980 Lerner
4,245,796 A 1/1981 Eglinton
4,306,656 A 12/1981 Dahlem
4,314,865 A 2/1982 Ottaviano
4,354,004 A 10/1982 Hughes et al.
4,493,684 A 1/1985 Bolton
4,518,654 A 5/1985 Eichbauer
4,545,180 A 10/1985 Chung et al.
4,564,407 A 1/1986 Tsurata
4,576,669 A 3/1986 Caputo
4,597,244 A 7/1986 Pharo
4,616,472 A 10/1986 Owensby et al.
4,619,635 A 10/1986 Ottaviano
4,631,901 A 12/1986 Chung et al.
4,664,577 A 5/1987 Bonali
4,676,376 A 6/1987 Kerswetter
4,787,755 A 11/1988 Branson
4,793,123 A 12/1988 Pharo
4,847,126 A 7/1989 Yamashiro et al.
4,874,093 A 10/1989 Pharo
4,904,092 A 2/1990 Campbell et al.
4,918,904 A 4/1990 Pharo
4,922,687 A 5/1990 Chow et al.
4,931,033 A 6/1990 Leeds
4,945,714 A 8/1990 Bodolay et al.
5,041,317 A 8/1991 Greyvenstein
5,070,675 A 12/1991 Chuan-Shiang
5,094,657 A 3/1992 Dworak et al.
5,117,608 A 6/1992 Nease et al.
5,141,494 A 8/1992 Danforth et al.
5,181,614 A 1/1993 Watts
5,188,691 A 2/1993 Caputo
5,203,761 A 4/1993 Reichental et al.
5,210,993 A 5/1993 van Boxtel
5,216,868 A 6/1993 Cooper et al.
5,257,492 A 11/1993 Watts
5,272,856 A 12/1993 Pharo
5,289,671 A 3/1994 Lerner
5,307,969 A 5/1994 Menendez
5,340,632 A 8/1994 Chappuis
5,351,828 A 10/1994 Becker et al.
5,383,837 A 1/1995 Watts
5,394,676 A 3/1995 Lerner
5,454,642 A 10/1995 DeLuca
5,468,525 A 11/1995 Watts
5,470,300 A 11/1995 Terranova
5,552,003 A 9/1996 Hoover et al.
5,651,237 A 7/1997 DeLuca
5,693,163 A 12/1997 Hoover et al.
5,699,653 A 12/1997 Hartman et al.
5,722,218 A 3/1998 Lerner
5,733,045 A 3/1998 Jostler et al.
5,755,328 A 5/1998 DeLuca
5,810,200 A 9/1998 Trokhan
5,824,392 A 10/1998 Gotoh et al.
5,921,390 A 7/1999 Simhaee
RE36,501 E 1/2000 Hoover et al.
6,015,047 A 1/2000 Greenland
6,015,357 A 1/2000 Ricca
RE36,759 E 7/2000 Hoover et al.
6,116,000 A 9/2000 Perkins et al.
6,199,349 B1 3/2001 Lerner
6,209,286 B1 4/2001 Perkins et al.
6,213,167 B1 4/2001 Greenland
6,282,716 B1 9/2001 Patterson et al.
6,367,975 B1 4/2002 Cronauer et al.
6,410,119 B1 6/2002 DeLuca et al.
6,447,864 B2 9/2002 Johnson et al.
6,460,313 B1 10/2002 Cooper
6,488,222 B1 12/2002 West et al.
6,499,278 B2 12/2002 Cronauer et al.
6,519,916 B1 2/2003 Brown
6,527,147 B2 3/2003 Wehrmann
6,550,229 B2 4/2003 Sperry et al.
6,565,946 B2 5/2003 Perkins et al.
6,582,800 B2 6/2003 Fuss et al.
6,625,956 B1 9/2003 Soudan
D480,646 S 10/2003 Borchard et al.
D480,971 S 10/2003 DeLuca et al.
6,635,145 B2 10/2003 Cooper
6,651,406 B2 * 11/2003 Sperry et al. .................... 53/403
6,659,150 B1 12/2003 Perkins et al.
6,672,037 B2 1/2004 Wehrmann
6,696,127 B1 2/2004 Mitchell, Jr.
D490,711 S 6/2004 DeLuca et al.
6,751,926 B1 6/2004 Cooper
6,761,960 B2 7/2004 DeLuca et al.
6,786,022 B2 9/2004 Fuss et al.
6,889,739 B2 5/2005 Lerner et al.
6,948,296 B1 9/2005 Lerner et al.
6,952,910 B1 10/2005 Lorsch
6,955,846 B2 10/2005 Lerner
D512,311 S 12/2005 DeLuca et al.
D513,182 S 12/2005 DeLuca et al.
7,125,463 B2 10/2006 Lerner et al.
7,165,375 B2 1/2007 O'Dowd
7,223,462 B2 5/2007 Perkins et al.
7,513,090 B2 4/2009 Wehrmann
7,533,772 B2 5/2009 Yoshifusa et al.
7,550,191 B2 6/2009 Lerner
D596,031 S 7/2009 Wehrmann
7,571,584 B2 8/2009 Lerner
D599,118 S 9/2009 Perkins et al.
D603,705 S 11/2009 Wehrmann
7,718,028 B2 5/2010 Lerner et al.
7,757,459 B2 7/2010 Wehrmann
7,767,288 B2 8/2010 Lerner
D630,945 S 1/2011 Wehrmann
7,897,219 B2 3/2011 Wehrmann
7,897,220 B2 3/2011 Wehrmann
8,038,348 B2 10/2011 Lerner
2001/0000719 A1 5/2001 Lerner
2001/0013215 A1 8/2001 Fuss et al.
2001/0014980 A1 8/2001 Patterson et al.
2002/0108697 A1 8/2002 Perkins et al.
2002/0155246 A1 10/2002 Johnson et al.
2002/0174629 A1 11/2002 Cronauer et al.
2003/0089082 A1 5/2003 Fuss et al.
2003/0109369 A1 6/2003 Lerner et al.
2004/0265523 A1 12/2004 Koyanagi et al.
2005/0266189 A1 12/2005 Wehrmann
2006/0042191 A1 3/2006 Lerner
2006/0086064 A1 4/2006 Wehrmann
2006/0090421 A1 5/2006 Sperry

| | | | |
|---|---|---|---|
| 2007/0054074 A1 | 3/2007 | Wehrmann | |
| 2007/0054075 A1 | 3/2007 | Wehrmann | |
| 2009/0110864 A1 | 4/2009 | Wehrmann | |

FOREIGN PATENT DOCUMENTS

| | | |
|---|---|---|
| GB | 2384459 | 7/2007 |
| WO | 9746453 | 12/1997 |
| WO | 0071423 | 11/2000 |
| WO | 0153153 | 7/2001 |
| WO | 0185434 | 11/2001 |
| WO | 0226589 | 4/2002 |
| WO | 2005118408 | 12/2005 |
| WO | 2007070240 | 6/2007 |
| WO | 2009058749 | 5/2009 |

OTHER PUBLICATIONS

Response from U.S. Appl. No. 11/299,933 dated Oct. 14, 2010.
Notice of Allowance from U.S. Appl. No. 11/299,933 dated Dec. 28, 2010.
Office action from U.S. Appl. No. 11/496,654 dated Apr. 1, 2009.
Response from U.S. Appl. No. 11/496,654 dated Jun. 26, 2009.
Office action from U.S. Appl. No. 11/496,654 dated Aug. 11, 2009.
Amendment from U.S. Appl. No. 11/496,654 dated Dec. 11, 2009.
Office action from U.S. Appl. No. 11/496,654 dated Jan. 13, 2010.
Amendment from U.S. Appl. No. 11/496,654 dated Jun. 14, 2010.
Office action from U.S. Appl. No. 11/496,654 dated Jun. 28, 2010.
Pre-Appeal Brief Request and Notice of Appeal from U.S. Appl. No. 11/496,654 dated Nov. 29, 2010.
Office action from U.S. Appl. No. 11/496,645 dated Aug. 31, 2009.
Response from U.S. Appl. No. 11/496,645 dated Nov. 30, 2009.
Notice of Allowance from U.S. Appl. No. 11/496,645 dated Jan. 4, 2010.
Notice of Allowance from U.S. Appl. No. 11/496,645 dated Feb. 26, 2010.
Office action from U.S. Appl. No. 11/594,539 dated Apr. 19, 2010.
Response from U.S. Appl. No. 11/594,539 dated Jul. 19, 2010.
Office action from U.S. Appl. No. 11/594,539 dated Sep. 30, 2010.
Interview Summary from U.S. Appl. No. 11/594,539 dated Dec. 15, 2010.
Notice of Allowance from U.S. Appl. No. 11/594,539 dated Jan. 7, 2011.
Office action from U.S. Appl. No. 11/594,540 dated Sep. 3, 2010.
Response from U.S. Appl. No. 11/594,540 dated Dec. 3, 2010.
Office action from U.S. Appl. No. 11/594,540 dated Feb. 3, 2011.
Notice of Allowance from U.S. Appl. No. 29/332,921 dated Aug. 11, 2009.
Office action from U.S. Appl. No. 12/409,026 dated Feb. 4, 2010.
Response from U.S. Appl. No. 12/409,026 dated May 3, 2010.
Notice of Allowance from U.S. Appl. No. 12/409,026 dated Jun. 17, 2010.
Office action from U.S. Appl. No. 12/818,318 dated Dec. 10, 2010.
Office action from U.S. Appl. No. 12/507,220 dated Oct. 22, 2009.
Response to Office action from U.S. Appl. No. 12/507,220 dated Apr. 16, 2010.
Office action from U.S. Appl. No. 12/507,220 dated May 6, 2010.
Response from U.S. Appl. No. 12/507,220 dated Aug. 5, 2010.
Office action from U.S. Appl. No. 12/507,220 dated Aug. 12, 2010.
Amendment from U.S. Appl. No. 12/507,220 dated Dec. 13, 2010.
Office action from U.S. Appl. No. 12/507,220 dated Jan. 28, 2011.
Notice of allowance from U.S. Appl. No. 29/346,902 dated Sep. 9, 2010.
One page drawing, Briggs Bag 1, illustrates a web of pre-formed bags sold by Applicant for use in Applicant's SP machines more than one year prior to the priority date of the present application, Operation of Applicant's SP machines is disclosed by U.S. Patent Nos. 4,969,310; 5,743,070; 5,944,424; 5,722,218; and 6,035,611.
One page drawing Goody Bag 1, illustrates a web of pre-formed bags sold by Applicant for use in Applicant's SP machines more than one year prior to the priority of the present application. Operation of Applicant's SP machines is disclosed by U.S. Patent Nos. 4,969,310; 5,743,070; 5944,424; 5,722,218; and 6,035,611.
Response from U.S. Appl. No. 11/496,654 dated May 31, 2011.
Office action from U.S. Appl. No. 12/394,781 dated Jun. 10, 2011.
Response from U.S. Appl. No. 12/818,318 dated Jun. 10, 2011.
Notice of Allowance from U.S. Appl. No. 11/496,654 dated Jun. 20, 2011.
Response from U.S. Appl. No. 11/594,540 dated Jul. 5, 2011.
Office action from U.S. Appl. No. 11/594,540 dated Jul. 22, 2011.
Office action from U.S. Appl. No. 12/818,318 dated Jul. 29, 2011.
Communication from European Application No. 04252036.1 dated Jul. 19, 2011.
Search Report from European Application No. 05755434.7 dated Jul. 22, 2011.
International Search Report and Written Opinion from PCT/US05/18817 dated Mar. 30, 2007.
International Search Report and Written Opinion from PCT/US06/45447, dated Feb. 22, 2007.
International Search Report and Written Opinion from PCT/US08/81410 dated Mar. 31, 2009.
International Search Report and Written Opinion from PCT/US09/38344 dated Dec. 22, 2009.
Office action from U.S. Appl. No. 10/408,946 dated Jun. 7, 2004.
Amendment from U.S. Appl. No. 10/408,946 dated Sep. 23, 2004.
Office action from U.S. Appl. No. 10/408,946 dated Jan. 6, 2005.
Interview Summary from U.S. Appl. No. 10/408,946 dated Mar. 4, 2005.
Response from U.S. Appl. No. 10/408,946 dated Mar. 10, 2005.
Notice of Allowance from U.S. Appl. No. 10/408,946 dated Apr. 25, 2005.
Notice of Allowance from U.S. Appl. No. 10/408,947 dated Dec. 21, 2004.
Office action from U.S. Appl. No. 11/111,164 dated Apr. 27, 2006.
Response from U.S. Appl. No. 11/111,164 dated Jul. 17, 2006.
Notice of Allowance from U.S. Appl. No. 11/111,164 dated Aug. 23, 2006.
Office action from U.S. Appl. No. 11/141,304 dated Nov. 7, 2008.
Amendment from U.S. Appl. No. 11/141,304 dated Jan. 20, 2009.
Office action from U.S. Appl. No. 11/141,304 dated Apr. 28, 2009.
Amendment from U.S. Appl. No. 11/141,304 dated Jun. 24, 2009.
Office action from U.S. Appl. No. 11/141,304 dated Aug. 7, 2009.
Amendment from U.S. Appl. No. 11/141,304 dated Jan. 7, 2010.
Notice of Allowance from U.S. Appl. No. 11/141,304 dated Mar. 31, 2010.
Office action (Restriction) from U.S. Appl. No. 11/194,375 dated Nov. 13, 2006.
Office action from U.S. Appl. No. 11/194,375 dated Feb. 6, 2007.
Amendment from U.S. Appl. No. 11/194,375 dated May 4, 2007.
Office action from U.S. Appl. No. 11/194,375 dated Aug. 21, 2007.
Amendment from U.S. Appl. No. 11/194,375 dated Oct. 2, 2007.
Advisory action from U.S. Appl. No. 11/194,375 dated Oct. 9, 2007.
Office action from U.S. Appl. No. 11/194,375 dated Nov. 20, 2007.
Amendment from U.S. Appl. No. 11/194,375 dated Feb. 29, 2008.
Office action from U.S. Appl. No. 11/194,375 dated Jun. 2, 2008.
Amendment from U.S. Appl. No. 11/194,375 dated Aug. 4, 2008.
Advisory action from U.S. Appl. No. 11/194,375 dated Aug. 12, 2008.
Office action from U.S. Appl. No. 11/194,375 dated Sep. 19, 2008.
Amendment from U.S. Appl. No. 11/194,375 dated Dec. 19, 2008.
Notice of Allowance from U.S. Appl. No. 11/194,375 dated Apr. 10, 2009.
Office action from U.S. Appl. No. 11/252,365 dated Jan. 31, 2008.
Amendment from U.S. Appl. No. 11/252,365 dated Mar. 18, 2008.
Notice of Allowance from U.S. Appl. No. 11/252,365, dated Feb. 27, 2009.
Amendment after Allowance from U.S. Appl. No. 11/252,365 dated Mar. 4, 2009.
Office action from U.S. Appl. No. 11/299,933 dated Mar. 19, 2008.
Response from U.S. Appl. No. 11/299,933 dated Jun. 3, 2008.
Office action from U.S. Appl. No. 11/299,933 dated Sep. 16, 2008.
Response from U.S. Appl. No. 11/299,933 dated Nov. 17, 2008.
Office action from U.S. Appl. No. 11/299,933 dated Dec. 18, 2008.
Amendment from U.S. Appl. No. 11/299,933 dated Mar. 6, 2009.
Office action from U.S. Appl. No. 11/299,933 dated Jun. 12, 2009.
Response to Office action from U.S. Appl. No. 11/299,933 dated Dec. 9, 2009.
Office action from U.S. Appl. No. 11/299,933 dated Dec. 31, 2009.

Response from U.S. Appl. No. 11/299,933 dated Mar. 30, 2010.
Office action from U.S. Appl. No. 12/259,419 dated Sep. 16, 2011.
Response from U.S. Appl. No. 12/394,781 dated Oct. 10, 2011.
Final Office Action from U.S. Appl. No. 11/594,540 dated Mar. 5, 2012.
Office action from U.S. Appl. No. 12/818,318 dated Mar. 8, 2012.
Response to Examiner's Report for Canadian Appl. No. 2,569,049 dated Apr. 11, 2012.
Communication from EP Application No. 05755434.7 dated Apr. 11, 2012.
Response to Communication from EP Application No. 05755434.7 dated Aug. 3, 2012.
Notice of Allowance and Fees due for U.S. Appl. No. 12/259,419 dated Sep. 24, 2012.
Response to Office Action in U.S. Appl. No. 11/594,540 dated Oct. 15, 2012.
Office Action in U.S. Appl. No. 12/818,318 dated Aug. 8, 2012.
International Search Report and Written Opinion for PCT/US12/45718 dated Oct. 22, 2012.
Response from U.S. Appl. No. 11/594,540 dated Dec. 15, 2011.
Amendment in Response to Non-Final Office Action in U.S. Appl. No. 12/259,419 dated Dec. 7, 2011.
Office action from US U.S. Appl. No. 12/259,419 dated Jan. 18, 2012.
Final Office Action from U.S. Appl. No. 12/394,781 dated Feb. 15, 2012.
Response to Final Office Action from U.S. Appl. No. 12/818,318 dated Dec. 29, 2011.
Response from European Application No. 04252036.1 dated Nov. 15, 2011.

* cited by examiner

WEB AND METHOD FOR MAKING FLUID FILLED UNITS

RELATED APPLICATIONS

The present application is a divisional application of U.S. Ser. No. 11/594,539, filed on Nov. 8, 2006, entitled "Web and Method for Making Fluid Filled Units", which is a divisional application of U.S. Ser. No. 11/141,304, filed May 31, 2005 entitled "Web and Method for Making Fluid Filled Units", which claims priority from provisional patent application Ser. Nos. 60/576,004, entitled "Web for Fluid Filled Unit Formation," filed on Jun. 1, 2004, and provisional patent application Ser. No. 60/592,812, entitled "Air Pouch Machine," filed on Jul. 30, 2004, all of which are incorporated herein by reference in their entirety.

FIELD OF THE INVENTION

The present application relates to fluid filled units and more particularly to plastic webs of interconnected pouches and to processes of converting interconnected pouches to fluid filled units.

BACKGROUND

Machines for forming and filling dunnage units from sheets of plastic are known. Machines which produce dunnage units by inflating preformed pouches in a preformed web are also known. For many applications, machines which utilize preformed webs are preferred.

Typically, the entire length of sides of adjacent dunnage units formed from a preformed web are connected by perforations. To separate adjacent units, a worker grasps an edge of one unit with one hand, grasps an edge of an adjacent unit with the other hand, and carefully tears the dunnage units apart to separate the adjacent dunnage units.

SUMMARY

The present invention relates to plastic webs of interconnected pouches and processes of converting interconnected pouches to at least one row of dunnage units. In one embodiment, upon inflation of the pouches, a gap develops between each pair of adjacent fluid filled pouches. This gap remains after the fluid filled pouches are converted to dunnage units. The gap between each pair of dunnage units makes separating adjacent pouches easier and more efficient than with existing interconnected arrays of dunnage units.

In one embodiment, dunnage units are formed from a preformed flattened tubular web that includes a plurality of pouches defined by a plurality of transverse seals. As pouches are inflated, a gap forming area between adjacent pouches ruptures or otherwise separates. A gap is formed between newly formed and adjacent dunnage units. In one embodiment, the gap runs between an inflation edge line of perforations and a spaced apart opposite edge line of perforations. Pouches are converted to dunnage units by inflating the pouch with a fluid, substantially maintaining the inflated volume of the pouch, and hermetically sealing an inflated pouch.

The gap between the inflation edge line of perforations and the spaced apart opposite edge line of perforations makes separating the dunnage units much simpler and easier than separating dunnage units that are connected by a continuous line of un-ruptured perforations. In the present invention, to separate adjacent dunnage units, a worker simply inserts a hand or hands into the gap between adjacent dunnage units and applies forces on one or both of the dunnage units, which are connected only by the spaced apart lines of perforations. As the spaced apart lines of perforations rupture or otherwise separate the adjacent dunnage units are separated.

In one embodiment, an inflated volume is maintained in each air pouch by blowing air into an inflation opening of each pouch until substantially the entire inflation opening of the pouch is sealed. In one embodiment, the inflation opening is closed at a closing location located along the web path of travel. Air is provided into each pouch from a position slightly upstream of the closing location to maintain inflation of the pouch until it is sealed. For example, the inflation is maintained by blowing air into the inflation opening until the a trailing transverse seal of the pouch is within 0.250 inches of the closing position.

In one embodiment, inflated dunnage unit arrays comprise a single row of interconnected inflated pouches. The pouches are defined by first and second layers connected together at an inflation edge, an opposite edge seal, and by a pair of seals that are generally transverse to the inflation edge and the opposite edge. Each pair of adjacent inflated pouches are connected by an inflation edge line of perforations that extends inward and generally perpendicular to the inflation edge and an opposite edge line of perforations that extends inward and generally perpendicular to the opposite edge. The inflation edge line of perforations and the opposite edge line of perforations are spaced apart by a gap that allows a worker to insert an object, such as a hand, to easily separate the pair of adjacent inflated dunnage units.

In one embodiment, a web for forming dunnage units comprises a first elongated layer and a second elongated layer superposed over the first elongated layer. The first and second layers are connected by a frangible connection that extends along an inflation edge and a hermetic seal that extends along an opposite edge. The frangible connection at the inflation edge is configured to break when engaged by a blunt surface. A plurality of transverse seals extend from the hermetic seal to within a predetermined distance from the frangible connection. The hermetic seal and said transverse seals form a plurality of inflatable pouches.

Further advantages and benefits will become apparent to those skilled in the art after considering the following description and appended claims in conjunction with the accompanying drawings.

DETAILED DESCRIPTION

Figure 1:
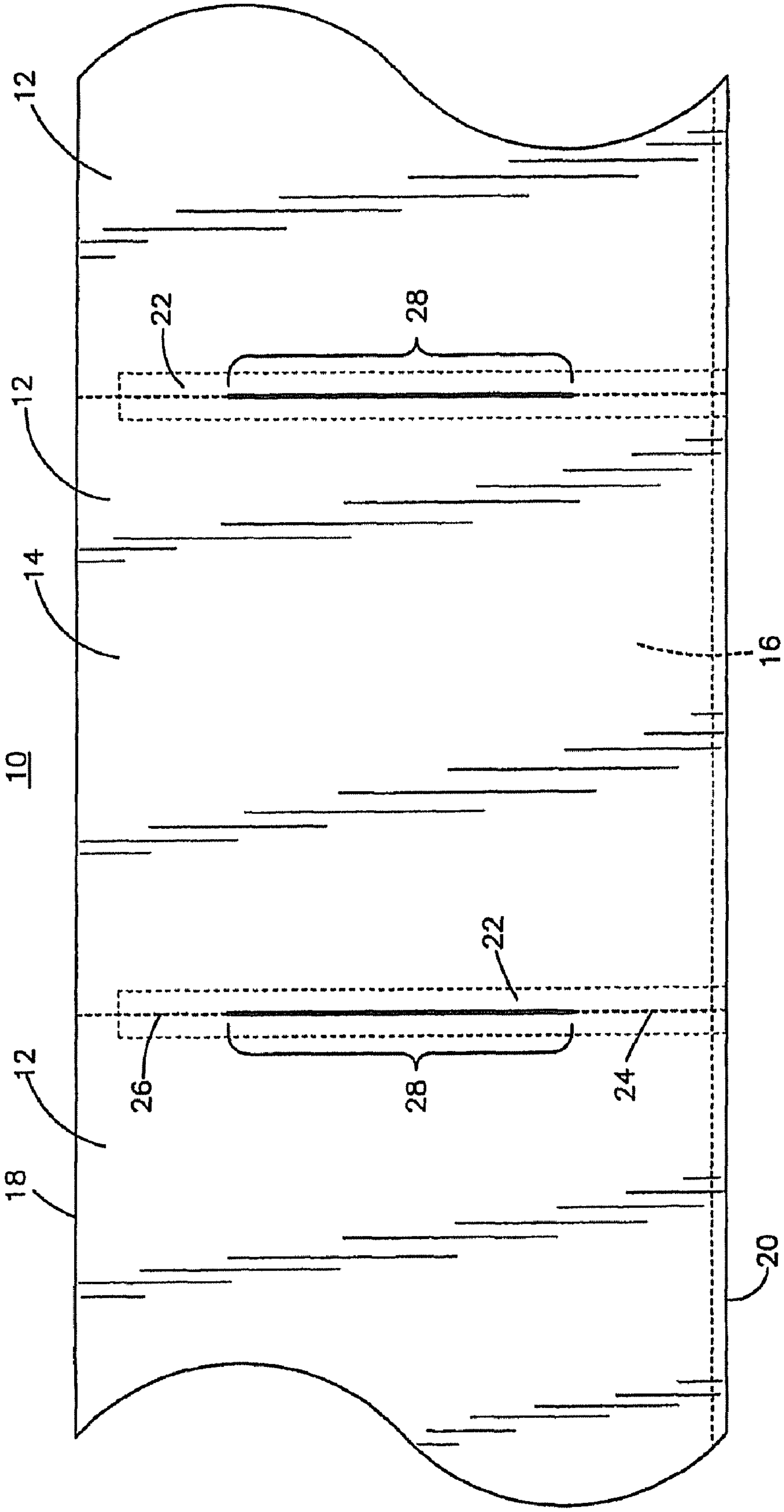
FIG. 1 illustrates a web for making fluid filled units.
Figure 2:
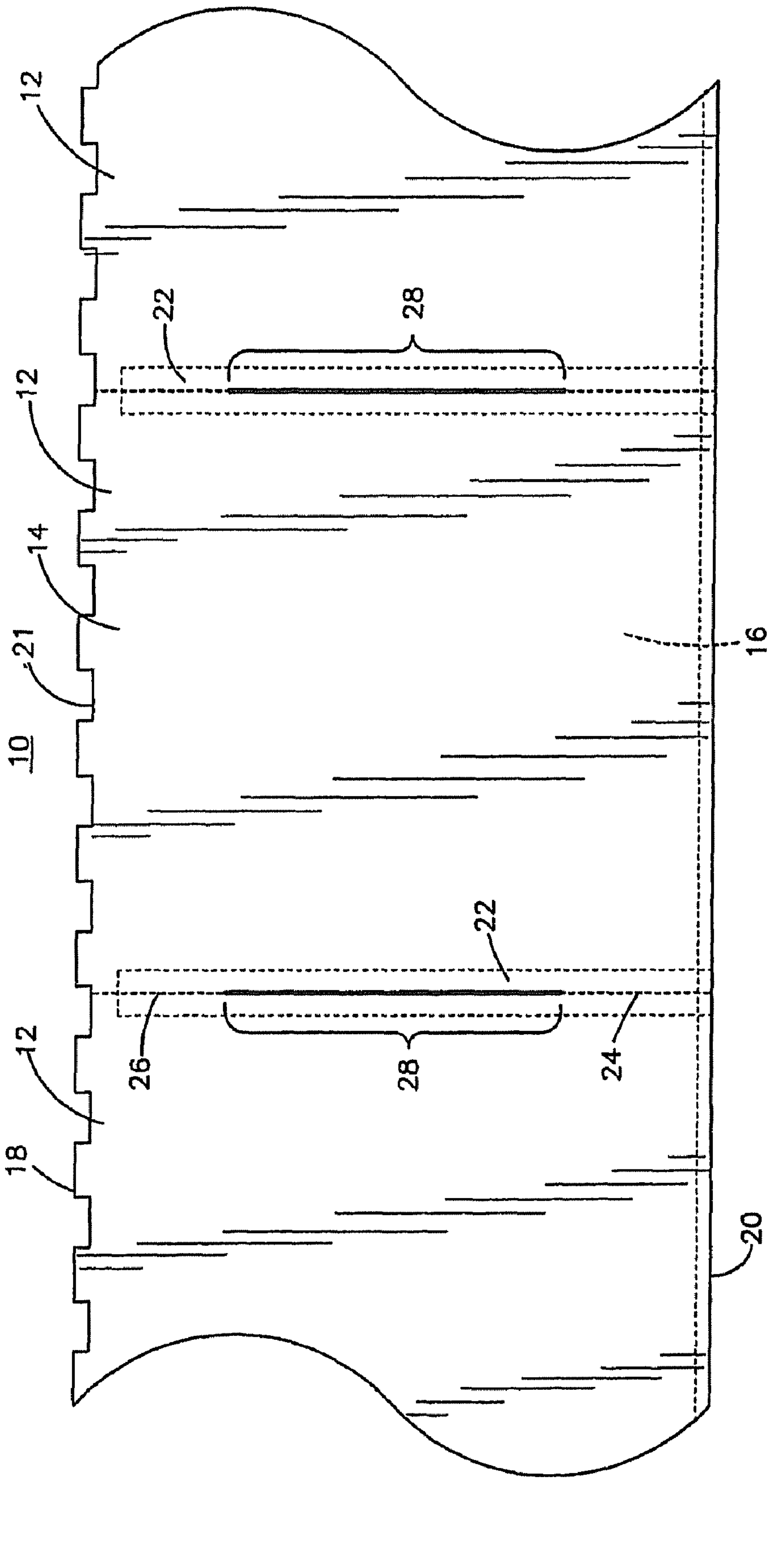
FIG. 2 illustrates a web for making fluid filled units.

Referring to FIGS. 1 and 2, exemplary illustrations of webs 10 of inflatable pouches 12 are shown. The webs 10 includes a top elongated layer of plastic 14 superposed onto a bottom layer of plastic 16. The layers are connected together along spaced edges, referred to as the inflation edge 18 and the opposite edge 20. In the example illustrated by FIG. 1, each edge 18, 20 is either a fold or a seal that connects the superposed layers 14, 16 along the edges 18, 20. The connection at the opposite edge 20 is illustrated as a hermetic seal and the connection at the inflation edge 18 is illustrated as a fold in FIG. 1. However, the fold and the seal could be reversed or both of the connections could be seals in the FIG. 1 embodiment. In the example illustrated by FIG. 2, the inflation edge 18 comprises a frangible connection 21 and the opposite edge 20 is a hermetic seal. The illustrated frangible connection 21 is a line of perforations. The size of the perforations is exaggerated to clarify FIG. 2. The frangible connection 21 may be formed by folding the inflation edge 18 and pulling the inflation edge over a serration forming wheel (not shown).

Referring to FIGS. 1 and 2, a plurality of longitudinally spaced, transverse seals 22 join the top and bottom layers 14, 16. Generally, each transverse seal 22 extends from the opposite edge 20 to within a short distance of the inflation edge 18. Spaced pairs of lines of perforations 24, 26 extend through the top and bottom layers terminating a short distance from the edges 18, 20 respectively. A gap forming area 28 extends between each associated pair of lines of perforations 24, 26. The gap forming area 28 opens to form a gap 13 when the pouches are inflated (see FIG. 3).

A gap forming area 28 denotes an area, preferably linear in shape, that will rupture or otherwise separate when exposed to a predetermined inflation force. The magnitude of the inflation force is less than the magnitude of the force needed to rupture or separate the spaced apart lines of perforations 24, 26. The gap forming area 28 can take on a number of embodiments, as will be discussed below. Any method that produces an area between the spaced apart lines of perforations 24, 26 that ruptures or otherwise separates at a force lower than a force needed to rupture or separate spaced lines of perforations 24, 26 may be employed to make the gap forming area 28.

Figure 3:
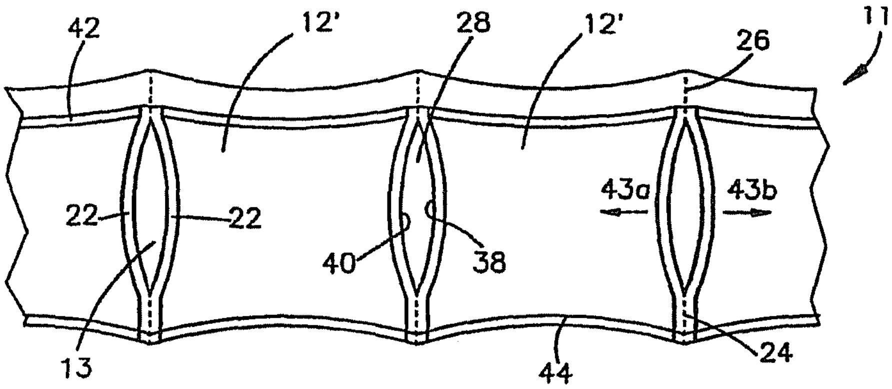
FIG. 3 illustrates a web with pouches inflated and sealed to form fluid filled units.

Referring to FIG. 3, the web 10 of pouches 12 (FIGS. 1 and 2) is inflated and sealed to form a row 11 of dunnage units 12'. The formed dunnage units 12' are configured to be much easier to separate from one another than prior art arrays of dunnage units. In the exemplary embodiment of FIG. 3, each adjacent pair of dunnage units 12' is connected together by a pair of spaced apart lines of perforations 24, 26. The spaced apart lines of perforations 24, 26 are spaced apart by a gap 13. A single row 11 of dunnage units 12' can be graphically described as being in a “ladder” configuration. This configuration makes separating two adjacent dunnage units 12' much easier than separating prior art arrays of dunnage units. To separate a pair of adjacent dunnage units 12, a worker simply inserts an object or objects, such as a hand or hands, into the gap 13 and pulls one dunnage unit 12' away from the other dunnage unit 12'. In the alternative, a mechanical system can be used to separate dunnage units 12'. A machine can be configured to insert an object between adjacent dunnage units 12' and apply a force to separate the units Referring to FIGS. 1-3, prior to conversion to a dunnage unit, a pouch is typically hermetically sealed on three sides, leaving one side open to allow for inflation. Once the pouch is inflated, the inflation opening is hermetically sealed and the dunnage unit is formed. During the inflation process, as the volume of the pouch increases the sides of the pouch have a tendency to draw inward. Drawing the sides of the pouches inward will shorten the length of the sides of the pouch unless the sides of the pouch are constrained. In this application, the term foreshortening refers to the tendency of the length of a pouch side to shorten as the pouch is inflated. In prior art webs, the sides of the pouch are restrained, because sides of adjacent pouches are connected by lines of perforations that extend along the entire length of the pouches and remain intact during and after inflation. The foreshortening of the unrestrained sides, such as the inflation opening, may not be uniform. Restraining the sides of adjacent connected pouches can cause undesirable inflation induced stresses. These undesirable stresses caused because sides of adjacent pouches are connected and restrained, thus, limiting inflation and causing wrinkles to develop in the layers at the unrestrained inflation opening. The wrinkles can extend into a section of the inflation opening to be sealed to complete the dunnage unit, which may comprise the seal. One reason the seal can be compromised is that wrinkling can cause sections of the layers 14, 16 to fold on top of one another. A sealing station of a dunnage machine is typically set to apply the appropriate amount of heat to seal two layers of material. The sealing of multiple layers of material in the area of a wrinkle results in a seal that is weaker than remaining seal areas and may result in a small leak or tendency to rupture at loads lower than loads at which the dunnage units is designed to rupture.

In the embodiment illustrated by FIG. 3, the gap forming area 28, produces a gap 13 between adjacent pouches upon inflation. The gap allows foreshortening of the connected pouch sides and thereby reduces the undesirable stresses that are introduced during inflation as compared with prior art webs. In addition, the web with a gap 13 facilitates fuller inflation of each pouch. The gap 13 maintains the inflation opening substantially free of wrinkles as the inflation opening is sealed to convert the inflated pouches to a dunnage units.

The illustrated web 10 is constructed from a heat sealable plastic film, such as polyethylene. The web 10 is designed to accommodate a process for inflating each pouch 12 in the web to create a row or ladder 11 of dunnage units 12'. The gap forming area 28 creates a gap 13 between dunnage units 12', which facilitate a efficient and effective process for separating adjacent dunnage units 12' in the row or ladder 11.

Figure 4:
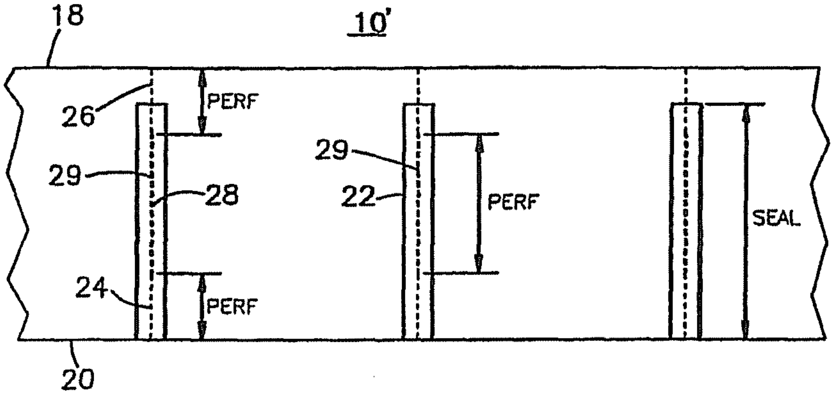
FIG. 4 illustrates a web for making fluid filled units.

In the example illustrated by FIG. 4, the gap forming area 28 defined by the web 10' includes an easily breakable line of perforations 29 between the spaced lines of perforations 24, 26. The force needed to rupture or separate the line of perforations 29 is less than the force needed to separate the perforations 24, 26 extending inward of the web edges 18, 20. Each pair of perforations 24, 26 and associated more easily breakable line of perforations 29 divide the transverse seal 22 into two transverse sections. As a pouch 12 is inflated, the line of perforation 29 begins to rupture or separate leading to the development of a gap 13 between the produced dunnage units 12' (See FIG. 3). Once the pouch 12 is fully inflated, the line of perforations 29 is fully or nearly fully ruptured; however the perforations 24, 26 at the edges remain intact. These perforations 24, 26 are ruptured or separated when a worker or automated process mechanically separates the perforations 24, 26.

Figure 5:
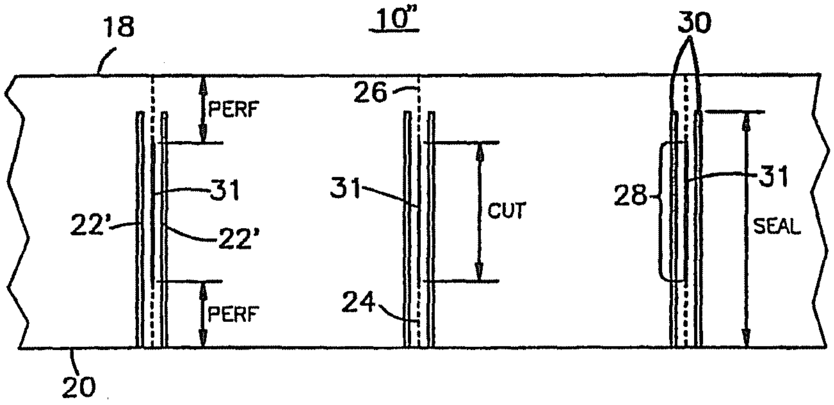
FIG. 5 illustrates a web for making fluid filled units.

FIG. 5 illustrates another embodiment of the web 10". In this embodiment the gap forming area 28 comprises an elongated cut 31 through both layers of material 14, 16. The cut 31 extends between each associated pair of lines of perforations 24, 26. In the embodiment illustrated by FIG. 5, pairs 30 of transverse seals 22' extend from the opposite edge 20 to within a short distance of the inflation edge 18. Each of the pairs of lines of perforations 24, 26 and corresponding cuts 31 are between an associated pair of transverse seals 30. It should be readily apparent that the seal 22 shown in FIG. 4 could be used with the cut 31 shown in FIG. 5. It should also be readily apparent that the line of perforations shown in FIG. 4 could be used with the transverse seals 22' shown in FIG. 5. It should be additionally apparent that any gap forming area 28 can be used with either of the transverse seal configurations 22, 22' shown in FIGS. 4 and 5.

Figure 6:
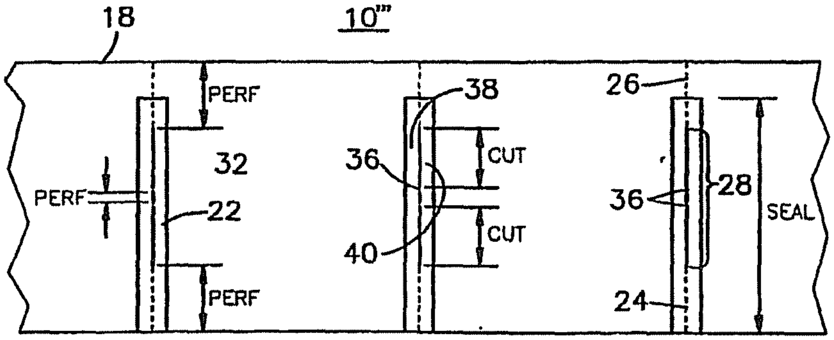
FIG. 6 illustrates a web for making fluid filled units.
Figure 7A:
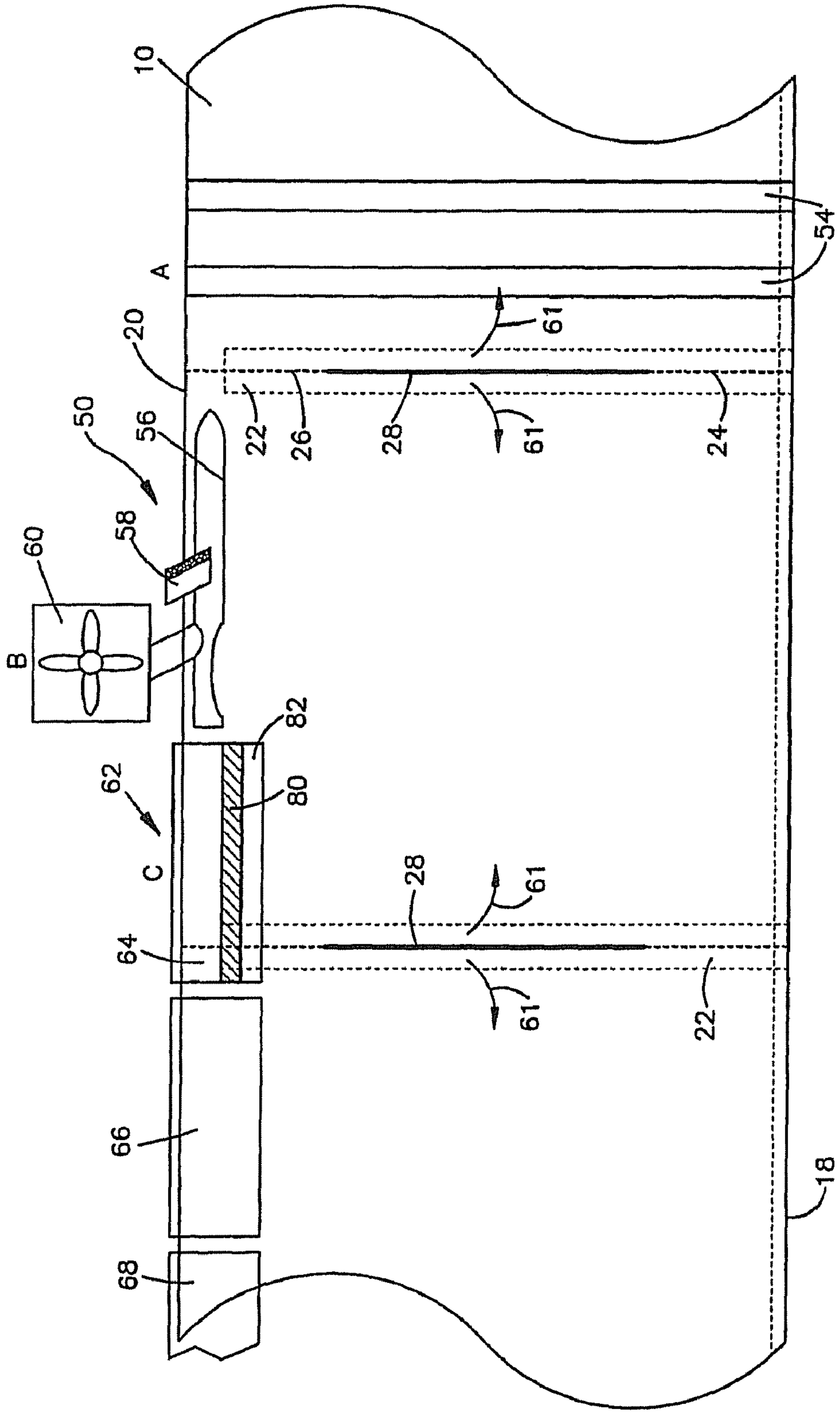
FIG. 7A schematically illustrates a plan view of a process and machine for converting web pouches to fluid filled units.
Figure 7B:
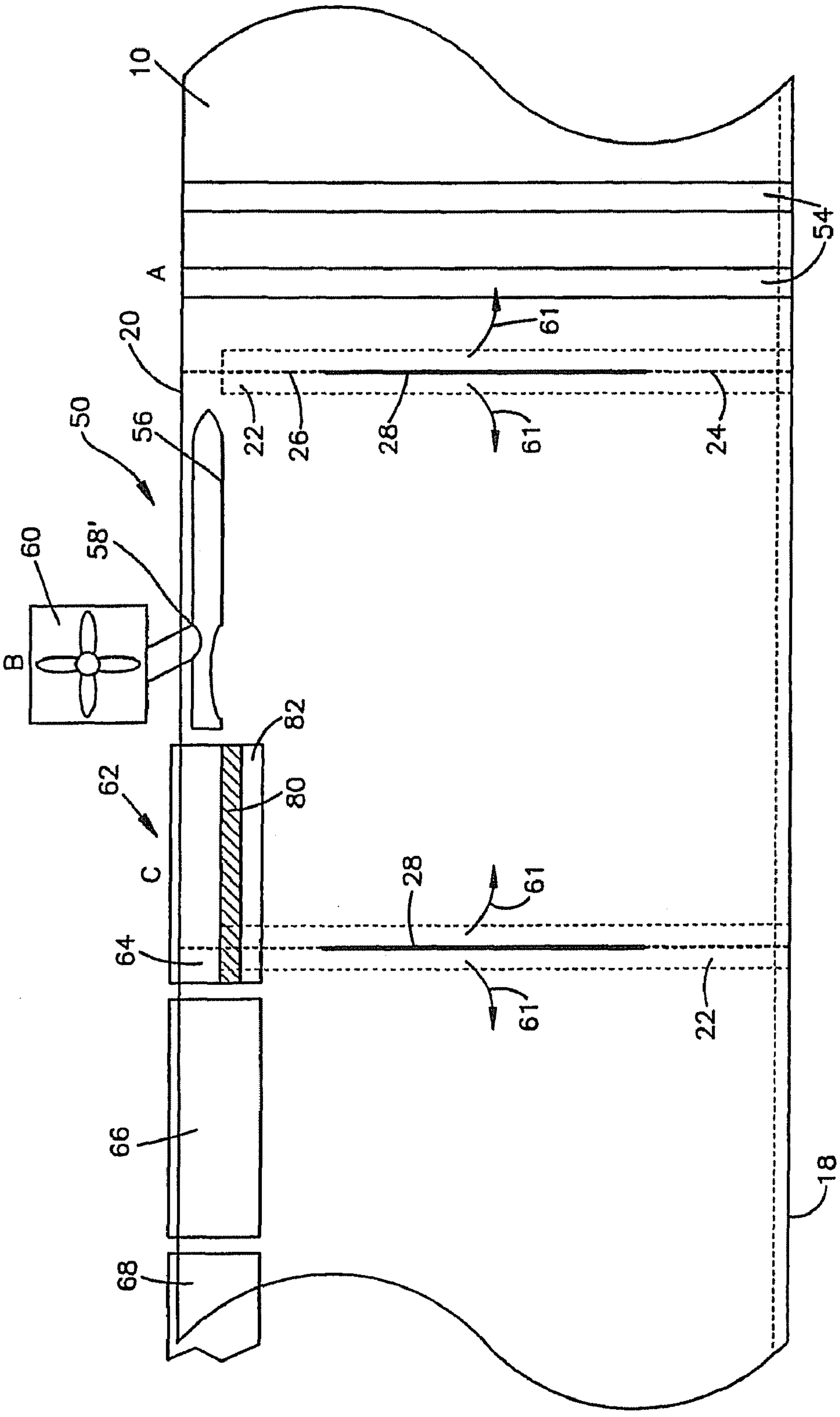
FIG. 7B schematically illustrates a plan view of a process and machine for converting web pouches to fluid filled units.

FIG. 6 illustrates a further embodiment of the web 10'''. In this embodiment, the gap forming area 28 comprises at least two elongated cuts 32, separated by light connections of plastic 36, also referred to as "ticks." These connections 36 hold transverse edges 38, 40 of the pouches 12 together to ease handling of the web 10, such as handling required during installation of the web 10 into a dunnage machine. As the pouches 12 are inflated, the connections 36 rupture or otherwise break resulting in a gap 13 between the spaced pairs of perforations 24, 26. This gap 13 allows for full inflation and reduces the stresses in the layers at the seal site normally caused by the foreshortening and restrictions on foreshortening of webs in the prior art. The reduced stress in the layers inhibits wrinkles along the inflation opening to be sealed.

Other methods of creating a gap forming area not specifically disclosed are with the scope of the present application. Any area that separates and forms a gap between adjacent pouches as pouches 12 in a web 10 are inflated are contemplated by this disclosure.

FIG. 3, illustrates a length of the web 10, 10', 10'' or 10''' after it has been inflated and sealed to form dunnage units 12'. An inflation seal 42, the transverse seals 22 and an opposite edge seal 44 hermetically seal the top and bottom layers. The side edges 38, 40 of the formed dunnage units are separated to form a gap 13. Each pair of adjacent dunnage units 12' are connected together by the pair of spaced apart lines of perforations 24, 26. The gap 13 extends between the pair of spaced apart lines of perforations 24, 26. The array of dunnage units 12' is a single row of dunnage units in a "ladder" configuration. The lines of perforations 24, 26 are configured to be easily breakable by a worker or automated system. To separate a pair of adjacent units 12', a worker inserts an object, such as the worker's hand or hands into the gap 13. The worker then grasps one or both of the adjacent dunnage units 12' and pulls the adjacent dunnage units 12' relatively apart as indicated by arrows 43*a*, 43*b*. The lines of perforation 24, 26 rupture or otherwise separate and the two adjacent dunnage units 12' are separated. The existence of the gap 13 also results in reduced stresses in the area of the inflation seal 42 at the time of sealing and accommodates increased inflation volume of the dunnage units 12' as compared with prior inflated dunnage units.

In one embodiment, the line of perforations 24 that extends from the opposite edge 20 is omitted. In this embodiment, the gap forming area 28 extends from the inflation edge line of perforations 26 to the opposite edge. In this embodiment, the gap 13 extends from the inflation edge line of perforations 26 to the opposite edge 20.

The connection of the layers 14, 16 at the inflation edge 18 can be any connection that is maintained between layers 14, 16 prior to the web 10 being processed to create dunnage units 12'. In the embodiment illustrated by FIG. 1, the connection is a fold. In the embodiment illustrated by FIG. 2, the connection is a line of perforations 21. One method of producing such a web is to fold a continuous layer of plastic onto itself and create a fold at what is to become the inflation edge 18, A tool can be placed in contact with the fold to create a line of perforation. The opposite edge 20 can be hermetically sealed and the transverse hermetic seals 22 can be added along with the separated lines of perforations 24, 26 extending inward from the inflation and opposite edges 18, 20. The web shown in FIG. 1 can be produced in the same manner, except the perforations are not added.

FIGS. 7A, 7B, 8A, 8B and 9 schematically illustrate a machine 50 and process of converting the webs 10, 10', 10'' and 10''' to dunnage units 12'. Referring to FIGS. 7A, 7B, 8A and 8B, a web 10, 10', 10'' or 10''' is routed from a supply 52 (FIGS. 8A and 8B) to and around a pair of elongated, transversely extending guide rollers 54. The guide rollers 54 keep the web taught as the web 10 is pulled through the machine 50. At location A, the web pouches are uninflated. In the embodiment illustrated by FIG. 5, pouch edges 38, 40 defined by the cut 31 are close to one another at location A. In the embodiments illustrated by FIGS. 4 and 6, the frangible connections 29, 36 are of sufficient strength to remain intact at location A.

A longitudinally extending guide pin 56 is disposed in the web at station B. The guide pin 56 is disposed in a pocket bounded by the top and bottom layers 14, 16, the inflation edge 18, and ends of the transverse seals 22. The guide pin 56 aligns the web as it is pulled through the machine. In the embodiment illustrated by FIGS. 7A and 8A, a knife cutter 58 extends from the guide pin 56. The knife cutter 58 is used to cut the inflation edge 18 illustrated by FIG. 1, but could also be used to cut the perforated inflation edge 18 illustrated by FIG. 2. The cutter 58 slits the inflation edge 18 as the web moves through the machine 50 to provide inflation openings 59 (See FIG. 9) into the pouches, while leaving the pouches otherwise imperforate. A variation of this would have the cutter 58 cutting either layer 14, 16, or both near the inflation edge 18. In the embodiment illustrated by FIGS. 7B and 8B, the guide pin 56 defines a blunt surface 58' and the knife cutter is omitted. The blunt surface 58' is used to break the perforated inflation edge illustrated by FIG. 2. The blunt surface 58' breaks open the inflation edge 18 as the web moves through the machine to provide the inflation openings into the pouches 12.

Figure 9:
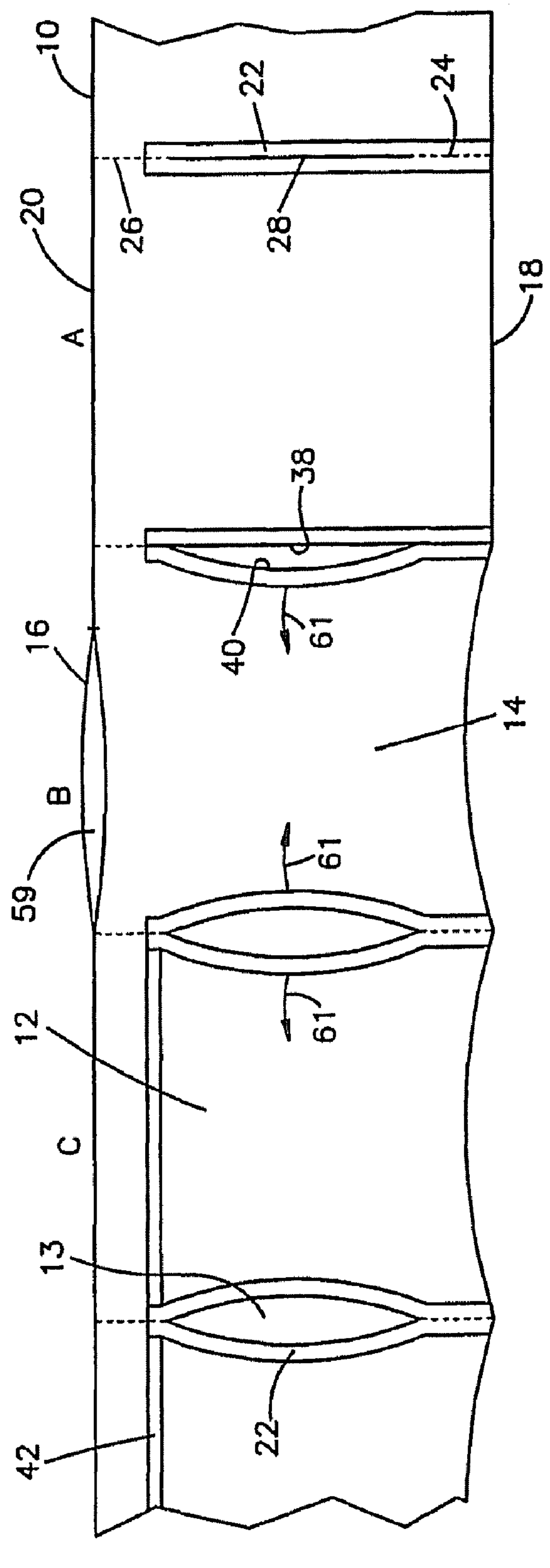
FIG. 9 illustrates a process for converting web pouches to fluid filled units.

A blower 60 is positioned after the cutter 58 or blunt surface 58' in station B. The blower 60 inflates the web pouches as the web moves past the blower. Referring to FIG. 9, the web pouches are opened and inflated at station B. The seal edges 38, 40 spread apart as indicated by arrows 61 (FIGS. 7A, 7B and 9) as the web pouches are inflated. In the embodiment illustrated by FIGS. 4 and 6, the frangible connections 29, 36 maintain successive pouches substantially aligned as the web is fed to the filling station B. The frangible connections are sufficiently weak that the connection between a pouch that has been opened for inflation and is being inflated at the fill station B and an adjacent, successive (or preceding) pouch will rupture as the pouch at the fill station is inflated. The spreading of the edges 38, 40 fauns a row of inflated dunnage units in a ladder configuration and increases the volume of the air that can enter the pouches. The spreading also reduces the stresses imparted to the web adjacent the inflation side edge 18 where it is to be sealed.

Figure 8A:
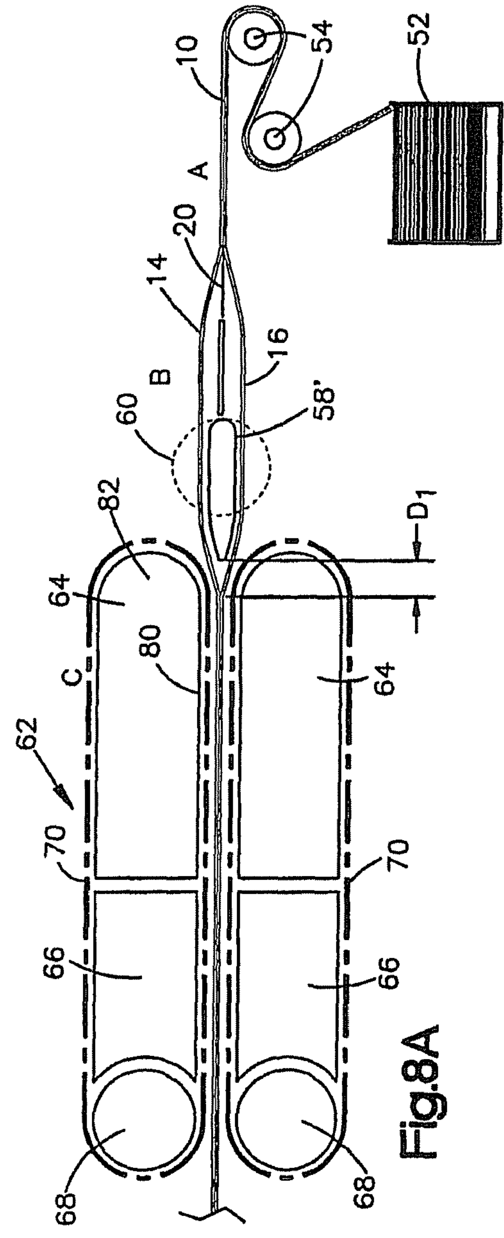
FIG. 8A schematically illustrates an elevational view of the process and machine for converting web pouches to fluid filled units.
Figure 8B:
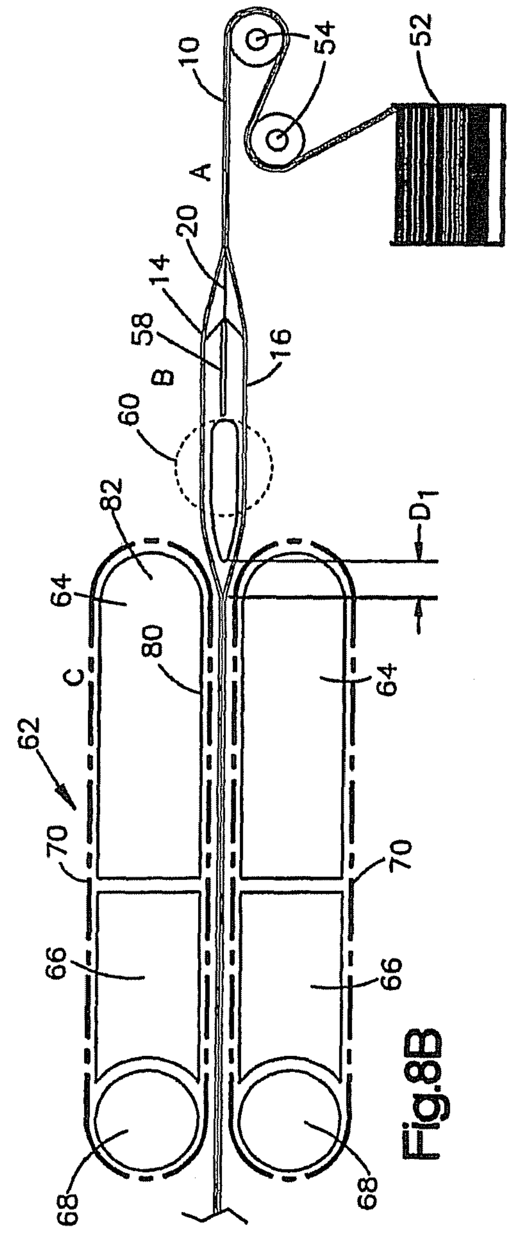
FIG. 8B schematically illustrates a an elevational view of the process and machine for converting web pouches to fluid filled units.

The inflation seal 42 is formed at station C by a sealing assembly 62 to complete each dunnage unit. In the exemplary embodiment, the inflated volume of the pouches is maintained by continuing to blow air into the pouch until substantially the entire length of the inflation opening 59 is sealed. In the example of FIGS. 8A, 8B and 9, the blower 60 blows air into a pouch being sealed up to a location that is a short distance $D_1$ from closing position where the sealing assembly 62 pinches the top and bottom layers 14, 16 to maintain the inflated volume of the pouches. This distance $D_1$ is minimized to minimize the volume of air that escapes from the inflated pouch before the trailing transverse seal of the inflated pouch reaches the closing position. For example, the distance $D_1$ may be 0.250 inches or less, to blow air into the inflation opening unit the trailing transverse seal is within 0.250 inches of the closing position.

In the examples illustrated by FIGS. 8A and 8B, the sealing assembly includes a pair of heated sealing elements 64, a pair of cooling elements 66, a pair of drive rollers 68, and a pair of drive belts 70. In an alternate embodiment, the pair of cooling elements is omitted. Each belt 70 is disposed around its respective heat sealing element 64, cooling element 66 (if included), and drive roller 68. Each belt 70 is driven by its respective drive roller 68. The belts 70 are in close proximity or engage one another, such that the belts 70 pull the web 10 through the heat sealing elements 64 and the cooling elements 66. The seal 42 is formed as the web 10 passes through first the heated sealing elements 64 and then a heat sink such as the cooling elements. One suitable heating element 64 includes heating wire 80 carried by an insulating block 82. Resistance of the heating wire 80 causes the heating wire 80 to heat up when voltage is applied. The cooling elements 66 cool the seal 42 as the web 10 is pulled between the cooling elements. One suitable cooling element is an aluminum (or other heat-sink material) block that transfers heat away from the seal 42. Referring to FIG. 9, the spreading of the edges 38, 40 greatly reduces the stress imparted on the web material at or near the seal 42. As a result, a much more reliable seal 42 is formed.

The present invention is not to be considered limited to the precise construction disclosed. Various modifications, adaptations and uses may occur to those skilled in the art to which the invention relates. All such modifications, adaptations, and uses fall within the scope or spirit of the claims.

The invention claimed is:

1. A web for forming dunnage units, comprising:

a first elongated layer having an inflation edge and an opposite edge;

a second elongated layer having an inflation edge and an opposite edge, wherein the second elongated layer is superposed over the first elongated layer, the first and second layers connected together at the opposite edges;

a plurality of transverse seals extending from the opposite edge to within a predetermined distance from the inflation edge, wherein the connection at the opposite edges and said transverse seals form a plurality of adjacent inflatable pouches;

a plurality of inflation edge lines of perforations through the first and second elongated layers that extend inward from the inflation edges;

a plurality of opposite edge lines of perforations through the first and second elongated layers that extend inward from the opposite edges; and a plurality of gap forming lines extending between the inflation edge lines of perforations and the opposite edge lines of perforations, wherein the inflation edge lines of perforations, the opposite edge lines of perforations, and the gap forming lines delineate side edges of adjacent pouches, wherein the web is configured such that inflation of the web causes the first layer to separate from the second layer along the side edges of the pouches, wherein the gap forming lines are configured such that inflation of the pouches also causes said web to separate along the gap forming lines such that portions of said side edges of adjacent pouches delineated by the gap forming lines move away from one another and wherein said inflation edge lines of perforations are configured such that inflation of the pouches leaves the inflation edge perforations intact.

2. The web of claim 1 wherein each of the gap forming lines comprises a single cut that extends from the inflation edge lines of perforations to the opposite edge lines of perforations.

3. The web of claim 1 wherein the gap forming lines comprise lines of perforations that extend from the inflation edge lines of perforations to the opposite edge lines of perforations, wherein said lines of perforations of the gap forming lines are broken upon inflation of the pouches.

4. The web of claim 1 wherein each of the gap forming lines comprise a line of perforations, wherein less force is required to break the gap forming line of perforations than the inflation edge lines of perforations and the opposite edge lines of perforations.

5. The web of claim 1 wherein each of the gap forming lines comprises elongated cuts that are separated by ticks of plastic.

6. The web of claim 1 wherein the first elongated layer and the second elongated layer are connected together at their inflation edges.

7. The web of claim 1 wherein the first elongated layer and the second elongated layer are sealed together at their inflation edges.

8. The web of claim 1 wherein the first elongated layer and the second elongated layer are sealed together at their opposite edges.

9. A web for forming dunnage units, comprising:

a first elongated layer having an inflation edge and an opposite edge;

a second elongated layer having an inflation edge and an opposite edge, wherein the second elongated layer is superposed over the first elongated layer;

a plurality of transverse seals between the first and second elongated layers form a plurality of adjacent inflatable pouches;

a plurality of inflation edge lines of perforations through the first and second elongated layers that extend away from the inflation edges and toward the opposite edges;

a plurality of opposite edge lines of perforations through the first and second elongated layers that extend away from the opposite edges and toward the inflation edges; and a plurality of gap forming lines extending between the inflation edge lines of perforations and the opposite edge lines of perforations, wherein the inflation edge lines of perforations, the opposite edge lines of perforations, and the gap forming lines delineate side edges of adjacent pouches, wherein the gap forming lines are configured such that inflation of the pouches causes said web to separate along the gap forming lines such that portions of the side edges of adjacent pouches delineated by the gap forming lines move away from one another and wherein said inflation edge lines of perforations are configured such that inflation of the pouches leaves the inflation edge perforations intact.

10. The web of claim 9 wherein each of the gap forming lines comprises a single cut that extends from the inflation edge lines of perforations to the opposite edge lines of perforations.

11. The web of claim 9 wherein the gap forming lines comprise lines of perforations that extend from the inflation edge lines of perforations to the opposite edge lines of perforations, wherein said lines of perforations of the gap forming lines are broken upon inflation of the pouches.

12. The web of claim 9 wherein each of the gap forming lines comprise a line of perforations, wherein less force is required to break the gap forming line of perforations than the inflation edge lines of perforations and the opposite edge lines of perforations.

13. The web of claim 9 wherein each of the gap forming lines comprises elongated cuts that are separated by ticks of plastic.

14. The web of claim 9 wherein the first elongated layer and the second elongated layer are connected together at their inflation edges.

15. The web of claim 9 wherein the first elongated layer and the second elongated layer are connected together at their opposite edges.

16. The web of claim 9 wherein the first elongated layer and the second elongated layer are connected together at their inflation edges and are connected together at their opposite edges.

17. The web of claim 9 wherein the first elongated layer and the second elongated layer are sealed together at their inflation edges.

18. The web of claim 9 wherein the first elongated layer and the second elongated layer are sealed together at their opposite edges.

19. The web of claim 9 wherein the first elongated layer and the second elongated layer are sealed together at their inflation edges and are sealed together at their opposite edges.

20. The web of claim 1 wherein the separation of the first layer from the second layer along the gap forming lines is spaced apart from said portions of said side edges by the transverse seals.

* * * * *